United States Patent [19]
Cox et al.

[11] Patent Number: 5,852,451
[45] Date of Patent: Dec. 22, 1998

[54] PIXEL REORDERING FOR IMPROVED TEXTURE MAPPING

[75] Inventors: Michael B. Cox, Menlo Park; Dinyar B. Lahewala, Newark; Dong-Ying Kuo, Pleasanton, all of Calif.

[73] Assignee: S3 Incorporation, Santa Clara, Calif.

[21] Appl. No.: 780,787

[22] Filed: Jan. 9, 1997

[51] Int. Cl.$^6$ ................................................ G09G 5/36
[52] U.S. Cl. ..................... 345/509; 345/516; 345/521; 345/430
[58] Field of Search ................... 345/425, 428–430, 345/113, 507, 186, 510, 509, 516, 520, 521; 711/5, 104, 105, 168, 169, 207, 209, 113, 158–160, 133–136; 395/823, 824, 872–874

[56] References Cited

U.S. PATENT DOCUMENTS

| | | | |
|---|---|---|---|
| 5,269,001 | 12/1993 | Guttag | 345/510 |
| 5,287,470 | 2/1994 | Simpson | 711/157 |
| 5,551,002 | 8/1996 | Rosich et al. | 711/134 |
| 5,579,052 | 11/1996 | Artieri | 348/416 |
| 5,600,837 | 2/1997 | Artieri | 395/673 |
| 5,613,083 | 3/1997 | Glew et al. | 711/207 |
| 5,630,096 | 5/1997 | Zuravleff et al. | 711/154 |
| 5,655,122 | 8/1997 | Wu | 395/705 |
| 5,715,407 | 2/1998 | Barth et al. | 395/290 |

OTHER PUBLICATIONS

International Search Report for application No. PCT/US97/24264, May 7, 1988.
Edenfield, R. *Advances in the 68040 Memory Subsystem*, Electronic Engineering, Feb. 1990, vol. 92 No. 758, pp. 35–41.
Wilson, R. *Graphics Drive Video DRAMs*, Electronic Engineering Times Nov. 1995, No. 876, pp. 74–79.
Edenfield, R. et al., "Advances in the 68040 Memory Subsystem", Electronic Engineering, v62,n758, p35(6), Feb. 1990.
Wilson, R., "Graphics Drive Video DRAMs", Electronic Engineering Timesm n876, p74(5), Nov. 1995.

*Primary Examiner*—Matthew M. Kim
*Assistant Examiner*—U. Chauhan
*Attorney, Agent, or Firm*—Fenwick & West LLP

[57] ABSTRACT

A system and method for reordering memory references for pixels to improved bandwidth and performance in texture mapping systems and other graphics systems by improving memory locality in conventional page-mode memory systems. Pixel memory references are received from a client graphics engine and placed in a pixel priority heap. The pixel priority heap reorders the pixel memory references so that references requiring a currently open page are, in general, processed before references that require page breaks. Reordered pixel memory references are transmitted to a memory controller for accessing memory.

14 Claims, 8 Drawing Sheets

PIXEL REORDERING FOR IMPROVED TEXTURE MAPPING

BACKGROUND OF THE INVENTION

1. Field of the Invention

The present invention relates generally to texture mapping in graphics systems, and more particularly to a system and method of reordering pixels to improve bandwidth and performance.

2. Description of Background Art

Texture mapping is the process of mapping an image onto a surface in a three-dimensional graphics system. This technique is well-known in the art, and is described, for example, in J. Foley et al., *Computer Graphics: Principles and Practice,* 2d. ed., Addison-Wesley, 1990, at 741–44.

Referring now to FIG. 1, there is shown an example of texture mapping according to the prior art. The image to be mapped is referred to as a texture map 101, and its individual elements are referred to as texels. Texture map 101 is typically described in a rectangular coordinate scheme designated (u, v), and is ordinarily stored in some area of conventional memory, such as, for example, a conventional page-mode dynamic random-access memory (DRAM) or other paged memory. In the example of FIG. 1, four pages 110, 111, 112, 113 are shown, each corresponding to a portion of the image area containing a corresponding portion of texture map 101.

Surface 104 in three-dimensional space has its own coordinate system (s, t). In a typical three-dimensional graphics system, surface 104 may be a primitive such as a polygon; many such polygons may be defined in three-space to form a three-dimensional object or scene. Each such polygon would then have its own coordinate system (s, t) similar to the surface 104 indicated in FIG. 1. Based on the orientation of surface 104 in three-space, and on the position and orientation of the "camera", surface 104 is in turn mapped onto a two-dimensional display grid 103 stored in the frame buffer for display by the computer system. The mapping of surface 104 onto display grid 103 is accomplished by matrix transforms that are well-known in the art. Display grid 103 has coordinate system (x, y) and is typically implemented in an area of memory reserved for video display, such as video random-access memory (video RAM) e.g. VRAM or synchronous graphics random-access memory (SGRAM). Display grid 103 contains individual elements known as pixels, represented by distinct memory locations in video RAM.

Each pixel in some region of display grid 103 maps onto a point on surface 104 and in turn to a point in texture map 101. Thus, in the example of FIG. 1, point $A_{xy}$ of display grid 103 maps onto point $A_{st}$ in the coordinates of surface 102 and to point $A_{uv}$ in texture map 101, or a group of points forming a region in texture map 101. Each of the mappings among display grid 103, surface 102, and texture map 101 may be point-to-point, point-to-region, region-to-point, or region-to-region. In conventional implementations of texture mapping systems, the mapping from display grid 103 to surface 104 and in turn to texture map 101 also generates a value d representing the level of detail for the particular texel. Typically, d is a measure of the perceived distance of the point in the texture map, as determined by a z-value for the point in the frame buffer. Points that are perceived to be farther away have a lower level of detail representing decreased resolution. In retrieving texels from texture map 101, d is used to implement a multum in parvo map (MIP map) scheme wherein several texels may be averaged and mapped onto one pixel of the frame buffer. The higher the value of d, the lower the level of detail, and the more pixel-averaging is performed. In the limit, the entire texture map may be reduced to one pixel in the frame buffer.

Conventional rasterization engines draw the image into the frame buffer by the known technique of scan conversion of primitives such as polygons and lines (see, for example, Foley et al.). Scan conversion takes as its input primitives defined in terms of vertices and orientations, and provides as its output a series of pixels to be drawn on the screen. As each pixel is generated by scan conversion, a rasterization engine performs the necessary mapping calculations to determine which texel of texture map 101 corresponds to the pixel. The rasterization engine then issues whatever memory references are required, such as texture fetch, z-fetch, z-writeback, color fetch, color write-back, and the like) to retrieve texel information for writing to the pixel begin processed. Thus, memory references are issued in the order generated by the scan conversion. Conventionally, such memory references are stored and managed according to a first-in first-out (FIFO) scheme using a FIFO queue.

It is known that conventional page-mode DRAM components incur access-time penalties when accessing memory locations from different memory pages. For example, in some memory architectures such as SGRAM, an access to an open page requires one cycle, a read from a page not open requires nine cycles, a write to a page not open requires six cycles, and an access to an open page on a different bank requires three cycles. Thus, the above-described scheme of issuing memory references in the order generated by scan conversion may incur such penalties, as the referenced areas of texture map 101 may lie in different pages. In fact, depending on the distortion of the texture boundaries resulting from the particular mapping transformation being employed, references generated in scan conversion order may require repeated page-switching back and forth. Since memory bandwidth is generally the bottleneck in fast generation of three-dimensional images, such repeated page-swapping results in diminished performance.

There have been attempts in the prior art to alleviate the above-described problem. One example is the use of specialized memory in place of conventional page-mode memory components. See, for example, H. Fuchs and J. Poulton, "Pixel-Planes: A VLSI-Oriented Design for a Raster Graphics Engine," in *VLSI Design,* vol. 2., no. 3, 1981; M. Deering et al., "FBRAM: A New Form of Memory Optimized for 3D Graphics," in *Computer Graphics, Proceedings of SIGGRAPH,* 1995; A. Schilling et al., "Texram: A Smart Memory for Texturing," in *IEEE Computer Graphics and Applications,* 1996. Such systems generally improve memory bandwidth by, for example, associating memory directly with processing on an application-specific integrated circuit (ASIC), or by associating logic with memory directly on a DRAM chip. See A. Schilling et al. However, such techniques require highly specialized components that are generally more expensive than conventional page-mode DRAM.

Another attempt to reduce memory bandwidth is described in K. Akeley, "RealityEngine Graphics," in *Computer Graphics, Proceedings of SIGGRAPH,* 1993. Akeley describes a system of extreme memory interleaving. This technique requires significantly more memory chips than do conventional memory systems, and consequently is more expensive.

What is needed is a system of reducing memory bandwidth by minimizing page-switching in conventional page-mode memory, so as to improve performance of graphic engines for a wide range of client algorithms without substantially increasing the number of components or the overall cost.

SUMMARY OF THE INVENTION

In accordance with the present invention, there is provided a system and method of reordering memory references required to process independent pixels in a texture mapping system in order to achieve improved memory locality and hence improved graphics performance using conventional page-mode memory components. Since the present invention does not require any changes to be made to the underlying graphics algorithm, memory locality for many such algorithms can be improved at once.

Various types of reads and writes may be performed in connection with rendering by a graphics engine. These include, for example, reading and writing for texture retrieval, retrieval of data from the frame buffer (such as color values, z-values, and the like), color write-back (final color write to frame buffer after resolving all applicable textures), and the like. The present invention reorders the reads and writes associated with pixels when performing such processing so that references that require the currently open page are, in general, processed before references that require opening another page, in order to improve memory locality and minimize page-switching. The technique described herein allows the graphics rasterization engine to achieve better bandwidth using conventional page-mode memory components and without require extreme memory interleaving.

The present invention employs a Pixel Priority Heap (PPH) to reorder pixels. In one embodiment, the PPH reorders addresses into texture memory to perform more reads from the same page before that page is closed and another opened. In alternative embodiments, the PPH is employed to reorder reads and writes from/to other clients as well. For example, PPH may be used to reorder references to destination addresses in the frame buffer to improve locality; this is advantageous when PPH reordering of texture memory references results in changes to the order of frame buffer writes, so that a PPH is beneficial to frame buffer addresses as well.

Each pixel generated by scan conversion is written, one per cycle, to the PPH. If the PPH is full, the pixel is not written, and the system waits until an entry becomes available in the PPH before writing to it.

Concurrently, the system attempts to select one pixel from the PPH and write it to a memory controller first-in first-out (FIFO) queue to be textured. If there are no pixels in the PPH, or if the memory controller FIFO queue is full, no pixel is written to the memory controller FIFO queue. In selecting a pixel from the PPH to be written into the memory controller FIFO queue, the system attempts to find a pixel whose PPH address contains a bank and row address (RAS) matching the open page on the last pixel read or written. If such a match is found, the access can be performed relatively quickly (e.g. in one cycle) on some memory systems. If no such match is found, the system attempts to find a pixel whose PPH address matches any open page, thus permitting intermediate-speed (e.g. three-cycle) access on some memory systems. If no such match is found, the system attempts to find any valid pixel in the PPH, regardless of bank or page address. On some memory systems, such an access is relatively slow (e.g. nine cycles for reads or six cycles for writes). In one embodiment, all such attempts to find matches are performed concurrently for improved performance.

The selected pixel is written to the memory controller FIFO queue and deleted from the PPH. On subsequent cycles, a memory controller issues the read or write corresponding to the pixel's PPH address. If the operation is a read, the data may then be returned from memory for subsequent processing depending on the application.

In addition, the PPH can implement conventional first-in first-out (FIFO) functionality. Such implementation may be useful, for example, when using the PPH in connection with z-buffering. As is known in the art, z-buffer is a technique whereby each pixel written to the frame buffer has an associated stored z-value in a z-buffer. Each incoming pixel write has a z-value that is compared with the stored z-value for the appropriate pixel, and is only written if the incoming pixel's z-value is less than the stored z-value. When the incoming pixel write is performed, the stored z-value is updated with the incoming pixel's z-value. See J. Foley et al.

The PPH also allows reads or writes to continue on an open page on a given bank while precharge is done on a page on an alternate bank.

In a preferred embodiment, the present invention operates in an essentially stateless manner. No decisions are explicitly based on previous decisions. Such essentially stateless operation is advantageous because it facilitates the use of simpler algorithms and simpler hardware. The present invention emphasizes correct rather than optimal operation by making relatively simple decisions that may not be optimal but that are correct in the sense that they result in performance that is preferably no worse than a conventional FIFO technique.

DETAILED DESCRIPTION OF THE INVENTION

Overall Operation

The following detailed description makes reference to several variables and terms, defined here for convenience:

N bit-length of index (i.e. address of chip and bank); preferred embodiment uses N=32;

$2^{N-1}$ number of banks of memory on this channel (0 represents null value);

$2^{N-2}$ number of chips on this channel (two banks each);

M bit-length of index of a pixel entry in Pixel Priority Heap; preferred embodiment uses M=5;

$2^{M-1}$ maximum number of entries in Pixel Priority Heap (0 represents null value).

Figure 1:
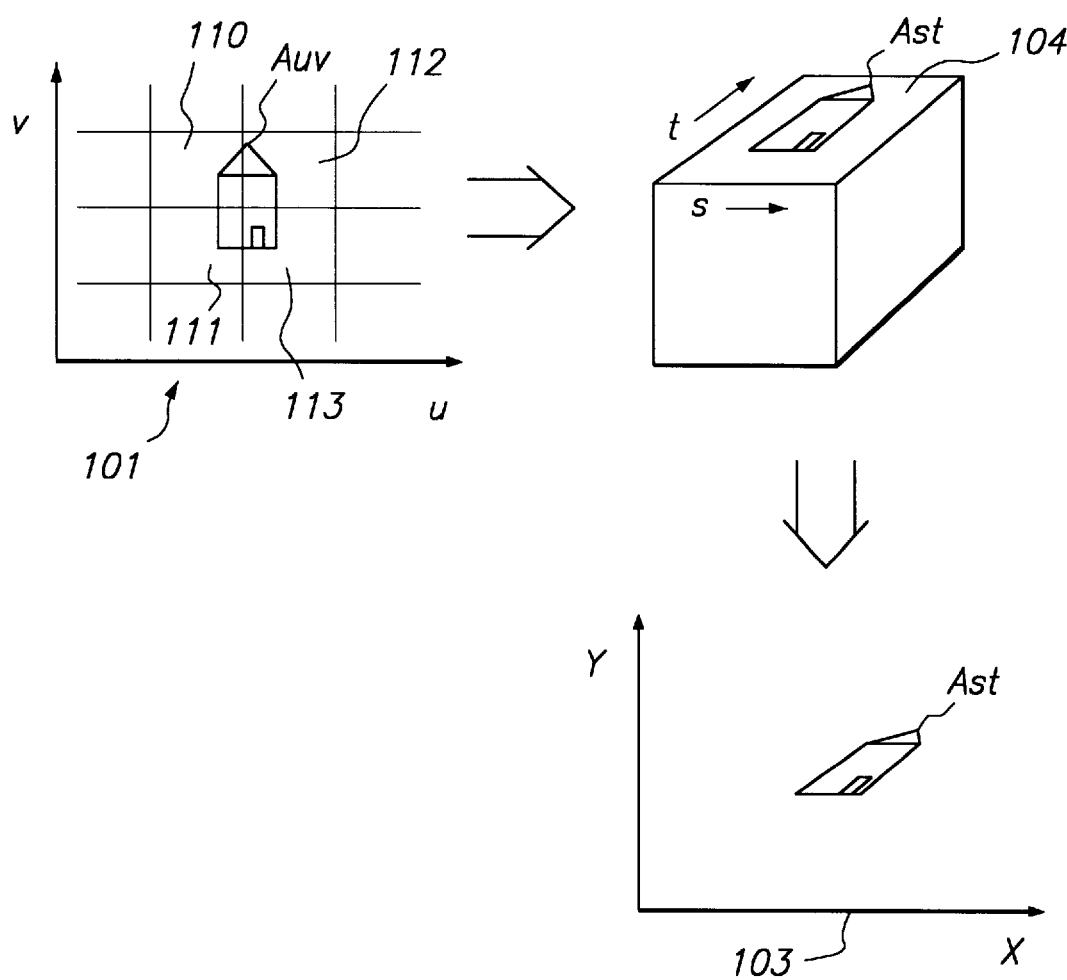
FIG. 1 is a diagram showing texture mapping according to the prior art.
Figure 2:
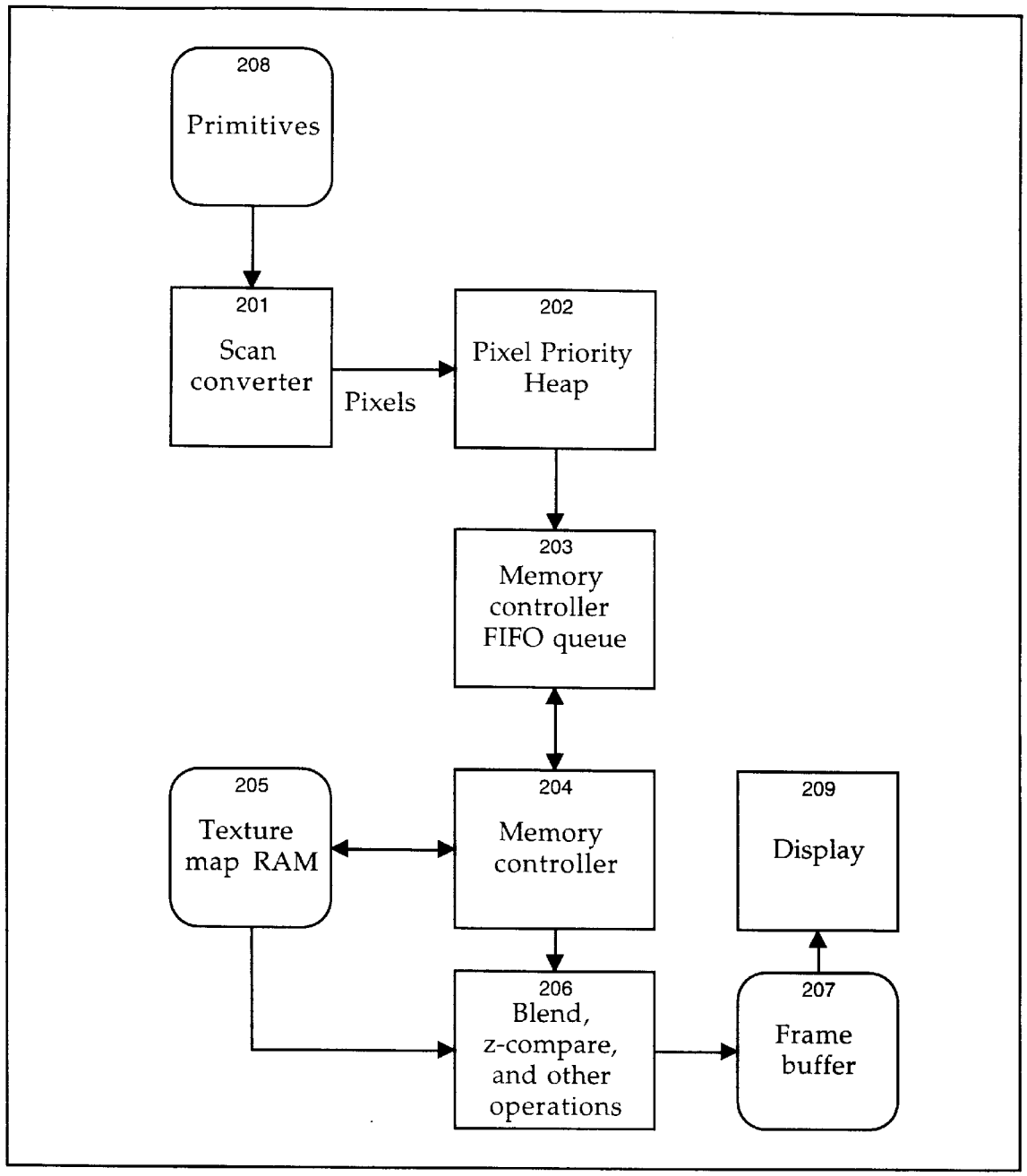
FIG. 2 is a block diagram showing overall architecture of an embodiment of the present invention.

Referring now to FIG. 2, there is shown a block diagram of the overall high-level architecture of an embodiment of the present invention. System 200 contains the following elements. Primitives 208 are stored in conventional manner and include, for example, definitions of polygons and lines. Scan converter 201 converts primitives 208 into pixels in a conventional manner. Each pixel is defined in terms of values for u, v, and d, which represent u and v coordinates in texture space, along with a distance value (also known as a compression value) for determining the level of detail for the pixel. In one embodiment, the u, v, and d values for pixels are written to Pixel Priority Heap (PPH) 202, at a rate of one pixel per cycle. In another embodiment, u, v and d values are mapped onto memory references represented as bank, row and column, and these memory references are written to PPH 202. In yet another embodiment, some combination of these two representations is used, depending on the operation being performed, as described below.

In one embodiment, PPH 202 is defined on one channel. If two or more channels are employed (e.g. left and right channels), it is preferable to have a PPH for each channel. This serves to queue pixels independently for each channel and can result in higher aggregate hit-rate because the locality improvement process is being effected for each channel separately. With multiple PPH's, a selector is employed to check address bits of pixels to determine the proper PPH for entry of the pixels. For example, in one embodiment the selector determines the proper PPH based on the last bit of the pixel address.

In one embodiment, a 1 MB chip (256K×32) is provided for each channel. Banks are numbered from 1 to $2^{N-1}$, where there are $2^{N-1}$ banks (0 is reserved as a null value).

In one embodiment, PPH 202 contains $2^{M-1}$ entries, each corresponding to one pixel to be textured. In one embodiment, two banks are provided for each chip.

Three types of pixels are defined: 1) a pixel to be textured (a tpixel); 2) a pixel to be z-buffered (a zpixel); and 3) a pixel to be written to (or read from) the frame buffer, or a texel to be written to texture memory (a cpixel). Each pixel type is associated with a number of fields, such as for example:

uv-address: a (17+N)-bit address into the texture map, where N bits uniquely identify the chip and bank, eight bits identify the column address (CAS), and nine bits identify the row address (RAS);

fb-address: a (17+N)-bit address into the frame buffer;

color: 24 bits (eight for red, eight for green, eight for blue);

z-value: 32 bits.

Cpixels and tpixels can be packed, so that the 24-bit color or 32-bit z-value can include four, two, or one colors or z-values. Packing and/or unpacking is accomplished by conventional means.

In one embodiment, the three types of pixels use the above-defined fields as follows:

tpixel: uv-address, fb-address, color;

zpixel: fb-address, z-value;

cpixel: fb-address, color.

According to one embodiment of the present invention, tpixels use uv-addresses as PPH addresses into frame buffer 207. Other types of pixels use fb-addresses.

Figure 4:
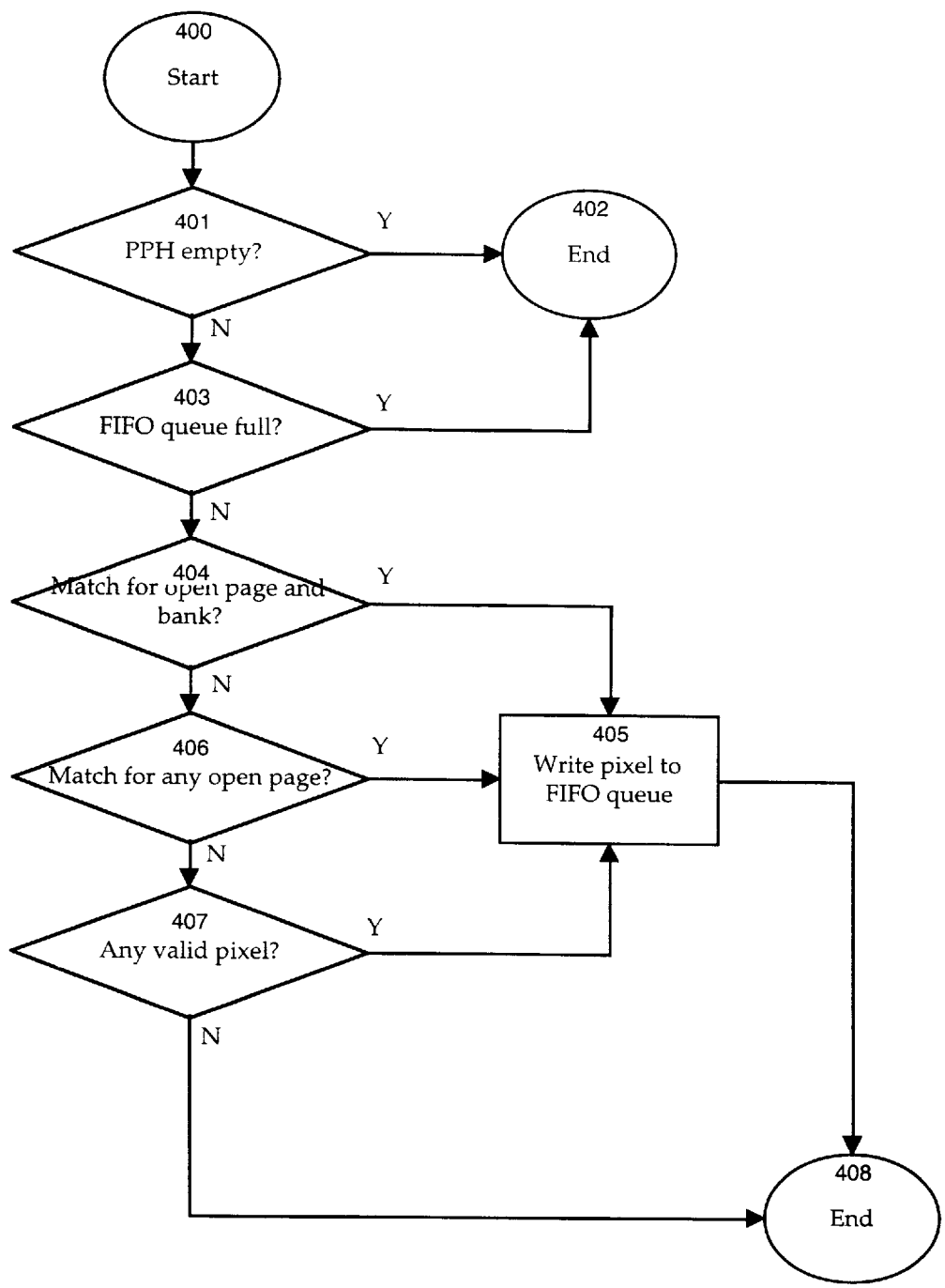
FIG. 4 is a flowchart of the method of selecting pixels from the pixel priority heap according to the present invention.

Pixels are selected from PPH 202 to be written into memory controller FIFO queue 203 according to the method shown in FIG. 4, which favors pixels on open pages to pixels in other memory locations. The steps shown in FIG. 4 are performed for each cycle. System 200 first checks 401 whether PPH 202 is empty; if so, the method ends 402 and no pixel is written to queue 203. If PPH 202 is not empty, system 200 checks whether queue 203 is full; if so, the method ends 402 and no pixel is written to queue 203. If queue 203 is not full, system 200 searches 404 for a pixel in PPH 202 whose PPH address contains a bank and row address (RAS) matching the open page and bank of the last pixel read or written. If such a pixel is found, system 200 writes 405 the pixel to queue 203. As stated previously, such access can be performed relatively quickly (e.g. in one cycle) on some memory systems. If no such pixel is found, system 200 searches 406 for a pixel in PPH 202 whose PPH address matches any open page. If such a pixel is found, system 200 writes 405 the pixel to queue 203. As stated previously, such access can be performed at intermediate speed (e.g. in three cycles) on some memory systems. If no such match is found, system 200 searches 407 for any valid pixel in PPH 202, regardless of bank or page address. If a valid pixel is found, system 200 writes 405 the pixel to queue 203. As stated previously, on conventional memory systems, such an access is relatively slow (e.g. nine cycles for reads or six cycles for writes). In one embodiment, searches 404, 406 and 407 are performed concurrently for improved performance.

Memory controller 204 retrieves pixels from queue 203 and performs accesses to texture map RAM 205 accordingly, based on the pixel representations from queue 203. Operations 206 such as blending, z-comparing, and the like are performed on the retrieved pixels as required by the application, for output into frame buffer 207 which is conventionally implemented in video RAM. Frame buffer 207 is output on display 209 which is implemented as a conventional cathode-ray tube or other output device.

Data Structures

According to one embodiment, system 200 uses the following data structures which define the fields of the entries in heap module 305 and pixels module 306. As noted above, associated with each heap module 305 entry is a nine-bit comparator, an N-bit comparator, and an M-bit comparator. Each entry provides three-bit global output (i.e., each entry provides three bits of output which must be provided as input to MPE 303), including the value of valid, and each one-bit result from the nine- and N-bit comparators.

```
Data Structure pph_heap:
    struct pph_heap {
        1-bit    valid;
        N-bit    bank;
        9-bit    RAS;
        M-bit    my_index;
        1-bit    =_index(
                    M-bit    input_index,
                    M-bit    this->my_index );
        1-bit    =_open_page(
                    9-bit    input_RAS,
                    9-bit    this->RAS       );
        1-bit    =_bank(
                    N-bit    input_bank,
                    N-bit    this->bank      );
    };
Data Structure pph_pixel:
    struct pph_pixel {
        N-bit    bank;
```

-continued

```
    9-bit    RAS;
    8-bit    CAS;
};
```

Implementation

Figure 3:
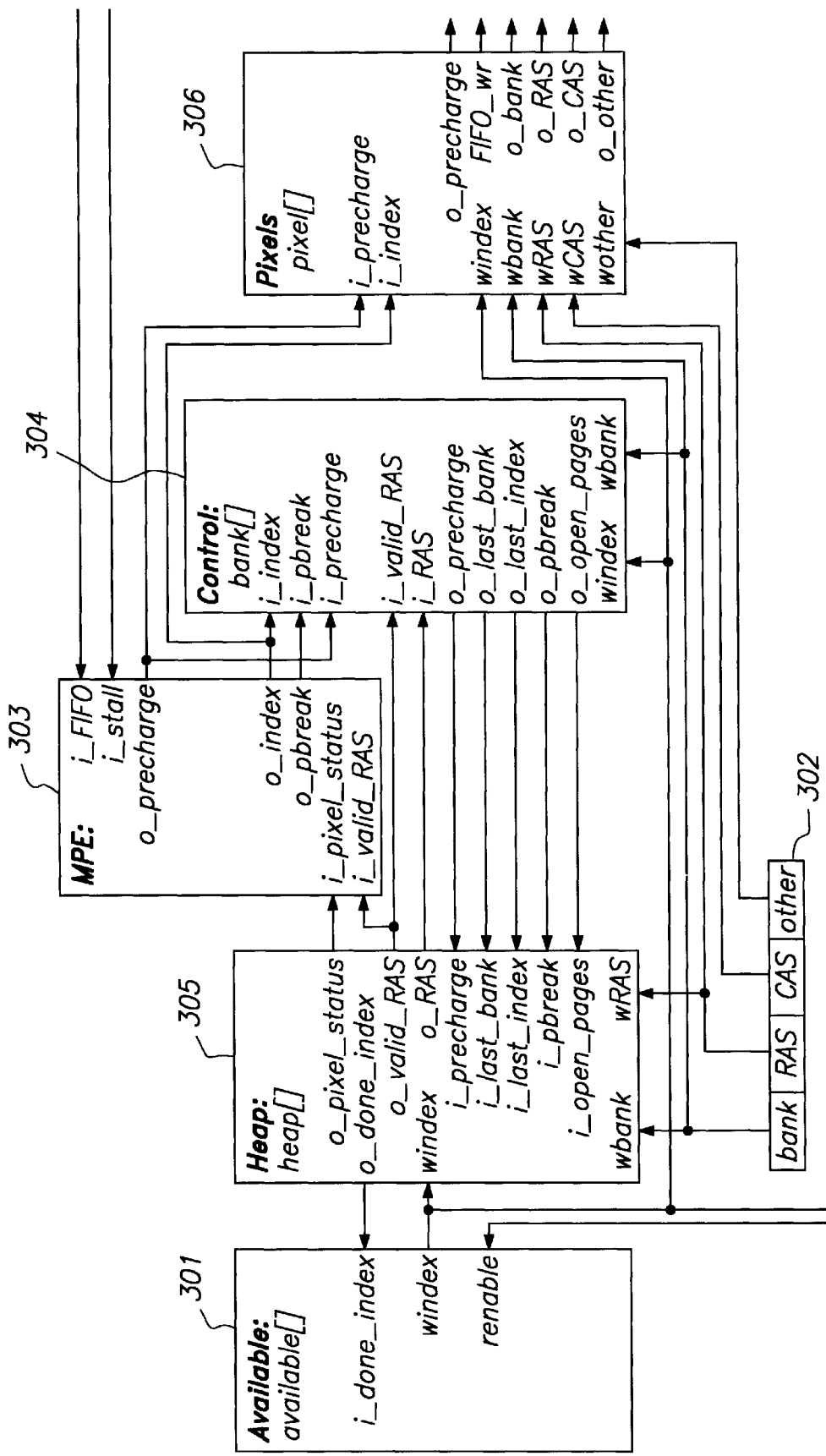
FIG. 3 is a block diagram showing detailed architecture of an embodiment of the present invention.

Referring now to FIG. 3, there is shown a detailed block diagram of an embodiment of the present invention. FIG. 3 contains components called Available module 301, Heap module 305, modified priority encoder (MPE) 303, Control module 304 and Pixels module 306, as well as address registers 302. Each of these components is described below. In the descriptions, each module first generates outputs based on current register/memory units, and then sets the register/memory values for the next cycle.

Available Module 301

Available module 301 is a FIFO queue containing up to $2^{M-1}$ M-bit indices representing available slots in PPH 202. The following signals are used by available module 301:

| Input: | |
|---|---|
| M-bit | i_done_index; |
| i-bit | renable; |
| Internal: | |
| M-bit | available[$2^{M-1}$]; |
| Output: | |
| M-bit | windex; |

A client (rendering engine) requests that a new pixel be entered into PPH 202 by asserting renable on Available module 301. The new pixel is placed in address registers 302, including bank, RAS, CAS, and other. Available module 301 returns a valid windex which write-enables Heap 202, Control module 204, and Pixels module 203 (any non-zero value write-enables these modules). When a non-zero windex is asserted, bank and RAS are written to Heap 202, the bank alone is written to Control module 204, and the full pixel is written to Pixels module 204. To determine if PPH 202 is full, the rendering engine (not shown) also reads the value of windex to check for a non-zero value. If PPH 202 is full, windex will be 0. When Heap module 305 removes a pixel that has been successfully output to memory controller 204, it returns to Available module 301 the o_done_index of the slot that contained the pixel. Whenever o_done_index is non-zero, write to available module 301 is enabled, and the value of o_done_index is itself entered in the FIFO queue. Finally, Available module 301 is initialized to contain all indices into PPH 202. Since an index is removed from Available module 301 whenever a new pixel is written to PPH 202, and since the same index is returned to the FIFO queue whenever the pixel is removed from PPH 202, any windex asserted by Available module 301 is always a valid index into an empty slot in PPH 202.

Thus, because the heap module 305 writes to the available module 301 only the indices of those pixels that have been removed from PPH 202, it is guaranteed that these writes always succeed. Heap module 305 cannot write a value of 0 to available module 301 (i_done_index=0 does nothing), and so neither can a value of 0 be returned when renable is asserted. Each cycle, an index can be read from and another index written to available module 301.

PPH 202 is implemented primarily by Heap module 305, MPE 303, and Control module 304. Each of these modules will now be described in turn.

Heap Module 305

Heap module 305 uses the following signals:

| Input: | |
|---|---|
| N-bit | wbank; /* pixel write into the PPH */ |
| 9-bit | RAS; |
| M-bit | windex; |
| 1-bit | i_pbreak; /* page-break indication */ |
| 1-bit | i_precharge; /* precharge */ |
| 9-bit | i_open_pages[$2^{N-1}$]; |
| M-bit | i_last_index; |
| N-bit | i_last_bank; |
| Internal: | |
| 1-bit | pbreak = 0; |
| 1-bit | in_precharge = 0; |
| 9-bit | save_RAS = 0; |
| struct pph_heap | heap[$2^{M-1}$] = { {0,0,0,1}, {0,0,0,2}, . . . {0,0,0,$2^M$}}; |
| Output: | |
| 3-bit | o_pixel_status[$2^{M-1}$]; /* valid+comparator results */ |
| 9-bit | o_RAS; /* page-break protocol */ |
| 1-bit | o_valid_RAS; |
| M-bit | o_done_index; /* pixel removal*/ |

Heap module 305 maintains a copy of all valid pixel bank and RAS addresses. Associated with each entry are tags providing information identifying page breaks and open pages to allow PPH 202 to determine in one cycle the best address to be written to the memory controller. This is implemented as two comparators (=_open_page( ) and =_bank( )). An additional comparator (=_index( )) is provided to allow each location in Heap module 305 to delete a pixel that was dispatched to memory controller 204 in the previous cycle. On each cycle, each location in heap module 305 compares its pixel's bank address with the i_last_bank address of the pixel last issued to memory controller 204, and its RAS address with the RAS address of the open page on the bank its pixel will be written to (i.e., it compares to i_open_pages[bank]). Combined with a valid bit for each location, these two comparators produce a three-bit result indicating the following:

111: the pixel is destined for the open page on the last bank written to;

011: the pixel is destined for an open page on another bank;

001 or 101: the pixel is valid but is not destined to any open page;

000: the pixel is not valid.

Each pixel has such a three-bit result, so that up to $2^{M-1}$ such results are generated and provided as input (i_pixel_status) to MPE 303.

In one embodiment, additional tags are provided to identify the primitive to which each pixel belongs. This is advantageous in order-dependent applications, i.e., in applications where it is preferable to preserve relative order of generation of primitives. A primitive ID field of, for example, two bits may be provided for each pixel.

Heap module 305 thus implements the following code:

Concurrently on each cycle:

```
{
    if (i_last_index == 0) o_done_index = 0;
    o_valid_RAS = (pbreak | in_precharge);
    o_RAS = save_RAS;
}
```

Concurrently on each cycle, each entry "this" in the heap[ ] performs:

```
{
    if (this->>=*index(this->my_index, i_last_index)) {
        save_RAS = this->RAS;
        if(!i_precharge) {
            /* Return slot to Available */
            o_done_index = this->my_index;
            this->valid = 0;
        }
        o_pixel_status[this->my_index] = 0;
    } else {
        /* Each entry provides three bits on output
         * (from MSB to LSB): banks match, pages
         * match, pixel valid. Each entry tests its
         * bank against the i_last_bank, and each uses
         * its own open bank as an index into the
         * i_open_pages[ ] to test its own RAS on that
         * bank against the page that is open on that
         * bank. */
        o_pixel_status[this->my_index]
            (this->>=_bank(i_last_bank, this-
                >bank)<<2 |
            (this->>=_open_page(open_pages[this-
                >bank], this->RAS)<<1) |
            this->valid;
    }
}
```

Concurrently on each cycle:

```
{
    if (windex>0){
        heap[windex].valid = 1;
        heap[windex].bank = wbank;
        heap[windex].RAS = RAS;
    }
    pbreak = i_pbreak;
    in_precharge = i_precharge;
}
```

Figure 8:
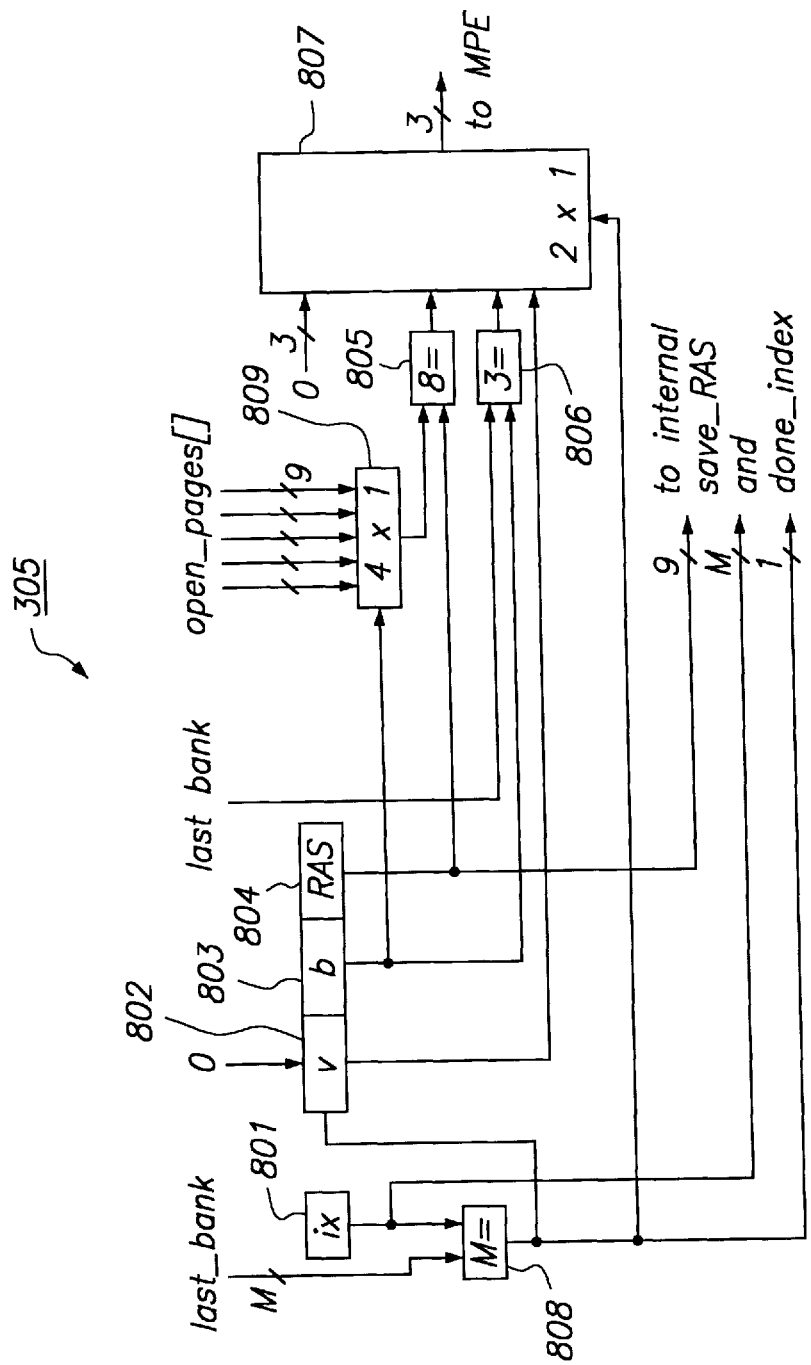
FIG. 8 is a block diagram of an implementation of a heap module according to one embodiment of the present invention.

Referring now to FIG. 8, there is shown an implementation of heap module 305 according to one embodiment of the present invention. In the example shown, N=3, for eight banks of memory on each channel and 8 MB of memory.

ix register 801 represents my_index. v 802 is the valid bit, b 803 is the bank. b 803 chooses one of the banks for comparison. Comparator 805 compares RAS 804 with open pages list 809. Comparator 806 compares the last bank accessed with b. Comparator 808 compares the last index and the current index ix 801, in order to make sure that a real entry is available. Multiplexer 807 takes the outputs from 805, 806 and 808 to generate a 3-bit signal to be sent to MPE 303.

MPE 303

MPE 303 uses the following signals:

Input:

| | | |
|---|---|---|
| 1-bit | i_FIFO; | /* PPH is in FIFO mode */ |
| 1-bit | i_stall; | |
| 3-bit | i_pixel_status[$2^{M-1}$]; | |
| 1-bit | i_valid_RAS; | |

Internal:

| | |
|---|---|
| M-bit | last_index = 0; |
| | /* initialized so after +, we will */ |
| | /* have first available */ |
| M-bit | tmp; |
| 1-bit | in_precharge = 0; |
| 1-bit | pbreak = 0; |

Output:

| | |
|---|---|
| M-bit | o_index; |
| 1-bit | o_pbreak; |
| 1-bit | o_precharge; |

MPE 303 chooses a "best" pixel to be output to memory controller 204 based on the following criteria, which is an implementation of the method described above in connection with FIG. 4:

Choose the index of a pixel with i_pixel_status=111 if there is any such pixel (same bank, same page) (step 404);

Choose the index of a pixel with i_pixel_status=011 if there is any such pixel (open page on another bank) (step 406);

Choose the index of a pixel with i_pixel_status=001 or 101 if there is any such pixel (any valid pixel) (step 407);

Return 0 (no valid pixels) (step 401 or 407).

MPE 303 implements the following code:

```
if (i_stall) {
    /* Memory controller FIFO must assert stall one
     * cycle before the FIFO is actually full . . .
     * this is because Pixels is one cycle behind
     * MPE, and that pixel must be written before
     * the PPH stalls output. */
    o_index = 0; o_pbreak = 0; o_precharge = 0;
} else {
    if (i_FIFO) {
        tmp = (last_index + 1) > 2^M ?
            1 : (last_index + 1);
        if (i_pixel status[tmp] & 0x01) {
            o_index = tmp; o_pbreak = 0;
            o_precharge = 0; last_index = tmp;
        }
    } else {
        Concurrently on each cycle over all 2^{M-1} inputs {
            /* bank precharge
             * TBD -- could add "there is an m such
             * that 0x07". */
            if (!pbreak && !in_precharge &&
                there is no j such that
                    (i_pixel_status[j]==0x03) &&
                there is a k such that
                    (i_pixel_status[k]==0x01) ) {
                o_index = k; o_pbreak = 0;
                o_precharge = 1; in_precharge = 1;
            } else if (!pbreak &&
                there is a j such that
                    (i_pixel_status[j]==0x07) ) {
                /*pixel reordering */
                o_index = j; o_pbreak = 0;
                o_precharge = 0;
            } else if (!pbreak && !in_precharge &&
                there is a j such that
                    (i_pixel_status[j]==0x03) ) {
```

-continued
```
                o_index = j; o_pbreak = 0;
                o_precharge = 0;
        } else if (!pbreak && !in_precharge &&
                there is a j such that
                    (i_pixel_status[j] & 0x01) ) {
                /* note the & implies don't care
                 * for bank */
                o_index = j; o_pbreak = 1;
                o_precharge = 0;
                pbreak = 1;
        } else {
                o_index = 0; o_pbreak =0;
                o_precharge=0;
            }
        }
    }
}
    if (i_valid_RAS) {
        in_precharge = 0; pbreak = 0;
}
```

Control Module 304

Control module 304 keeps track of which pages in which bank are open. The following signals are used by control module 304:

| Input: | | |
|---|---|---|
| N-bit | wbank; | /* pixel write to PPH */ |
| M-bit | windex; | |
| M-bit | i_index; | /* pixel read from PPH */ |
| 1-bit | i_pbreak; | /* page-break and precharge |
| 1-bit | i_precharge; | /* protocol */ |
| 1-bit | i_valid_RAS; | |
| 9-bit | i_RAS; | |
| Internal: | | |
| 1-bit | pbreak0 - 0, pbreak1 = 0; | |
| 1-bit | in_precharge1 = 0; | |
|  | in_precharge1 = 0; | |
| N-bit | last_bank = 0; | |
| N-bit | precharge_bank; | |
| M-bit | last_index = 0; | |
| N-bit | bank[$2^{M-1}$] = {0, 0, . . . 0}; | |
| 9-bit | open_pages[$^{N-1}$] = (0, 0, . . . 0}; | |
| Output: | | |
| N-bit | o_last_bank; /*to heap's comparators */ | |
| M-bit | o_last_index; | |
| 9-bit | o_open_pages[$2^{N-1}$]; | |
| 1-bit | o_pbreak; /* page update protocols */ | |
| 1-bit | o_precharge; | |

Control module 304 maintains the last_bank written and the last_index of the pixel written on the previous cycle, and also maintains a table of open_pages[ ]. It provides these as input to heap module 305. In addition, control module 304 and heap module 305 together (in a simple two-cycle protocol) maintain a correct version of the open_pages[ ] table. When a page break does occur, it is signaled by MPE 303 and no pixels are read from PPH 202 for two cycles (pixels may still be input into PPH 202 during these two cycles so long as PPH 202 is not full).

Control module 304 implements the following code:

Concurrently on each cycle:

```
{
    o_pbreak = pbreak0;
    o_precharge = in_precharge0;
```
```
    o_last_bank = last_bank;
    o_last_index = last_index;
    o_open_pages [ ] = open_pages [ ];
    if (i_valid_RAS) {
        if(pbreak1) open_pages[last_bank] = i_RAS;
        if (in_precharge1)
            open_pages[precharge_bank] = i_RAS;
    }
    if (i_index > 0) {
        if (i_precharge)
            precharge_bank = bank[i_index];
        else
            last_bank = bank[i_index];
    }
    last_index = i_index;
    pbreak1 = pbreak0; pbreak0 = i_break;
    in_precharge1 = in_precharge0;
    in_precharge0 = i_precharge;
    if (windex > 0) bank[windex] = wbank;
}
```

Pixels Module 306

Pixels module 306 is a standard RAM or a register file with control, containing pixel data and color information. The following signals are used by pixels module 306:

| Input: | |
|---|---|
| 1-bit | i_precharge; |
| M-bit | i_index; |
| M-bit | windex; |
| N-bit | wbank; |
| 9-bit | wRAS; |
| 8-bit | wCAS; |
| Internal: | |
| M-bit | rindex; |
| (17 + n)-bit | pixel[$2^{M-1}$]; |
| Output: | |
| 1-bit | o_precharge; |
| N-bit | o_bank; |
| 9-bit | o_RAS; |
| 8-bit | o_CAS; |
| 1-bit | FIFO_wr; |

A pixel is read every cycle from pixels module 306 and written to memory controller 204. The read from pixels module 306 is pipelined with the logic in control module 304, heap module 305, and MPE 303 so that the pixel selected in cycle t is read from pixels module 306 and written to the memory controller in cycle t+1. Of course, no pixel is read from pixels module 306 if PPH 202 is empty.

Pixels module 306 implements the following code:

```
if (rindex > 0) {
    o_precharge = i_precharge;
    o_bank, o_RAS, o_CAS, o_other = pixel[rindex];
    FIFO_wr = 1;
    rindex = i_index;
} else FIFO_wr = 0;
```

Read Operation

Figure 7:
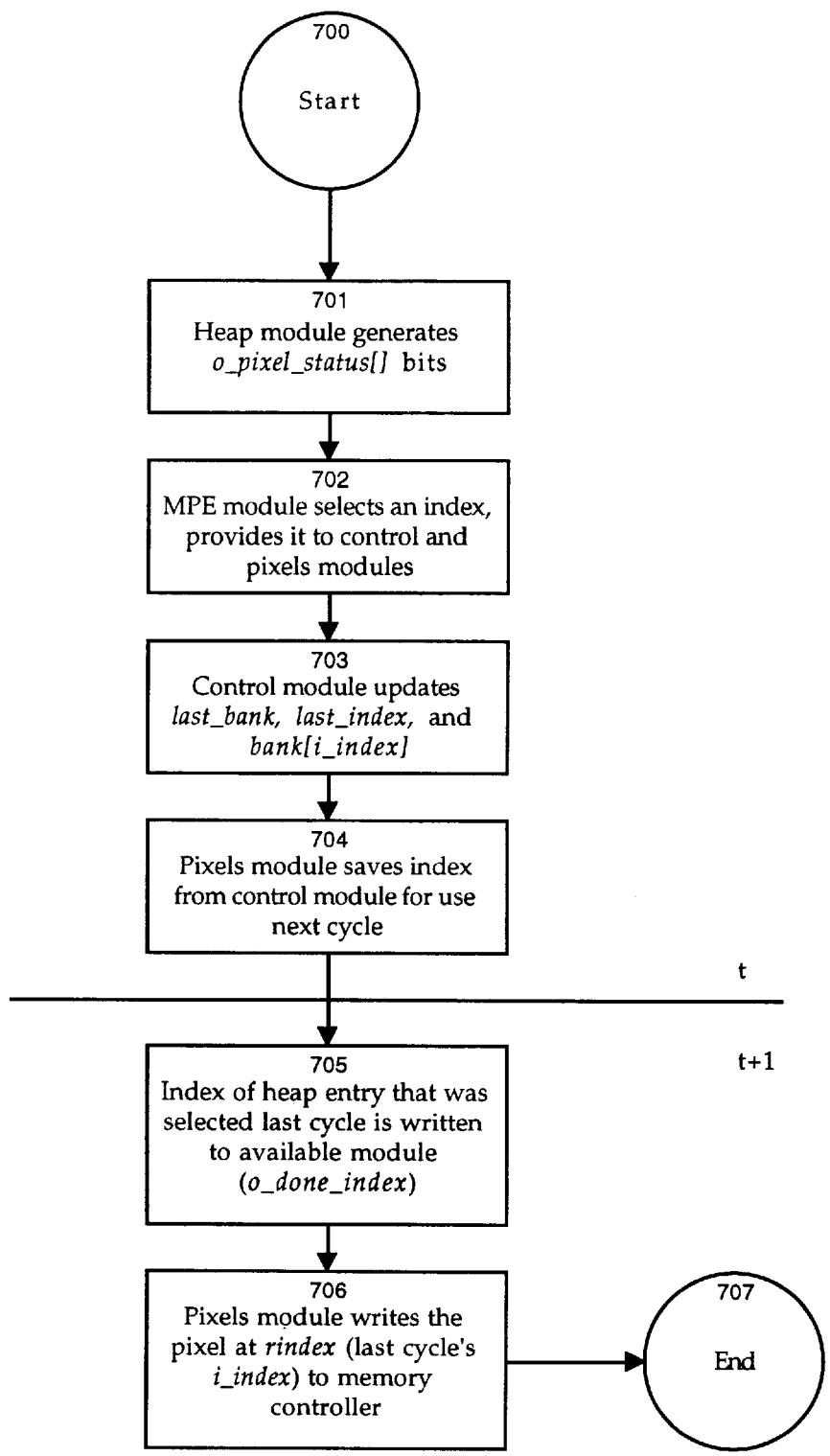
FIG. 7 is a flowchart of a method of reading from the PPH according to one embodiment of the present invention.

Referring now to FIG. 7, there is shown a flowchart of a PPH 202 read operation based on a two-cycle pipeline. The timing in this pipeline is based on two-phase clocking. In the first phase, PPH 202 processes signals from storage through combinational logic. In the second phase, storage is updated.

On cycle t, steps 700 through 704 occur; on cycle t+1, steps 705 through 707 occur.

Cycle t: First, the signals from control module 304 to heap module 305 must be valid. Then heap module 305 generates 701 all o_pixel_status[ ] bits. MPE 303 selects 702 an index and provides it to control module 304 and pixels module 306. Control module 304 updates 703 last_bank, last_index, and bank[i_index]. Pixels module 306 saves 704 the index obtained in 702 for use in the next cycle.

Cycle t+1: The index of the entry in heap module 305 that was selected in 702 last cycle (if any) is written 705 to available module 301 (o_done_index). Pixels module 306 writes 706 the pixel at rindex (last cycle's i_index) to memory controller 204.

FIFO Mode

PPH 202 is capable of operation as a simple FIFO queue if i_FIFO is asserted to MPE 303. Under such operation, MPE 303 keeps the last_index read from PPH 202 (this is initialized to 0) and on each cycle attempts to return ((last_index+1) mod $2^M$). In particular, if the pixel at this consecutive index (mod $2^M$) is valid (which MPE 303 can determine from i_pixel_status[ ]), MPE 303 returns that next index (o_index); MPE 303 in this case also saves the index as last_index. If the pixel at the consecutive index is invalid, MPE 303 sets o_index=0, and does not modify last_index.

As described above, available module 301 is a FIFO queue, and entries are returned to available module 301 in the order read from PPH 202. Given MPE's 303 operation in FIFO mode to return consecutive entries as long as the pixel is valid, PPH 202 thus operates in this mode as a FIFO queue. In one embodiment, the client of PPH 202 must assert i_FIFO throughout the time that FIFO mode is desired, and must also ensure that PPH 202 is empty before it is transitioned between FIFO mode and PPH mode. Any other operation is undefined.

Page Update Protocol

In one embodiment, when a page break occurs, two cycles are required to update the open pages table. When MPE 303 detects that a page break will occur as the result of a given pixel's bank and RAS address, it signals such to control module 304 via o_pbreak. Since the pixel index o_index is provided to control module 304 and is also provided to pixels module 306, the pixel is also written to memory controller 204 on the next cycle. Hence, whenever a pixel address that will cause a page break is issued to memory, there will soon be some length of dead time, e.g. six or eight cycles on some memory systems. PPH 202 can use this dead time to update tables on a page break. During the two additional cycles MPE 303 requires for page update after a page break, MPE 303 writes no candidate pixels to control module 304 or pixels module 306.

The page update protocol operates as follows. When control module 304 is informed by MPE 303 that a page break has occurred, it asks heap module 305 for the RAS address that caused the page break. When heap module 305 returns the RAS address (o_RAS and o_valid_RAS), control module 304 updates open_pages[ ] to the new address for that bank. In terms of cycles that begin at c, the protocol is as follows:

| Cycle | Source -> Destination (action) | Input to Destination |
|---|---|---|
| c | MPF 303 -> Control module 304 | i_pbreak asserted |
| c + 1 | Control module 304 -> Heap module 305 (heap module 305 saves page break RAS) | i_pbreak asserted |
| c + 2 | Heap module 305 -> Control module 304 (control module 304 updates open_pages[ ]) | RAS that caused break |
| c + 3 | . . . normal operation . . . | . . . normal operation . . . |

Figure 5:
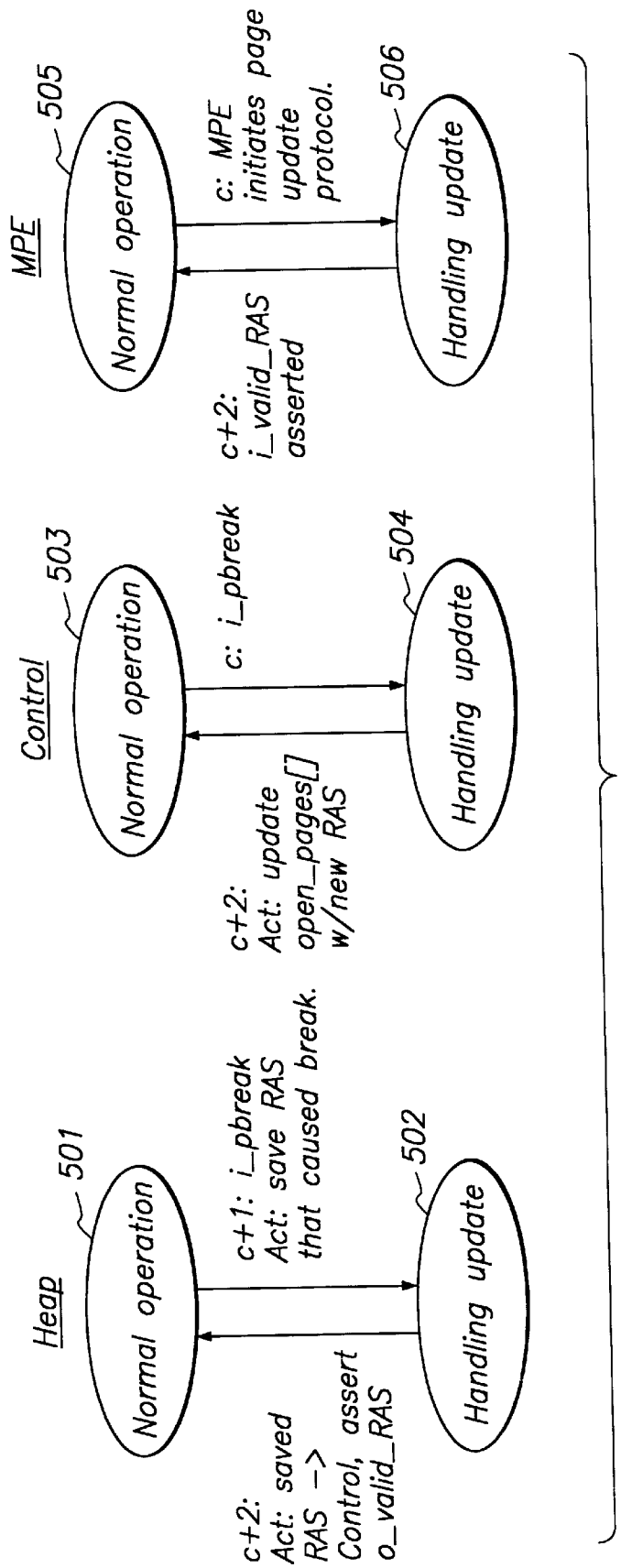
FIG. 5 is a state diagram showing page update operations.

Referring now to FIG. 5, there is shown a state diagram of page update operations. MPE 303, control module 304, and heap module 305 each have two states with respect to the page update protocol. MPE 303 is normally in state 505 and transitions to update state 506 at cycle c to initiate page update protocol. Control module 304 is normally in state 503 and transitions to update state 504 at cycle c upon receiving i_pbreak from MPE 303. Heap module 501 is normally in state 501 and transitions to update state 502 at cycle c+1 upon receiving i_pbreak from control module 304; at this time, heap module 501 also saves the RAS of the page break. At cycle c+2, MPE 303 asserts i_valid_RAS, heap module 305 sends saved RAS to control module 304 and asserts o_valid_RAS, and control module 304 updates open_pages[ ] with the new RAS. All three modules 303, 304, and 305 then return to their normal states 505, 503, and 501 respectively.

Alternate Bank Precharge

Figure 6:
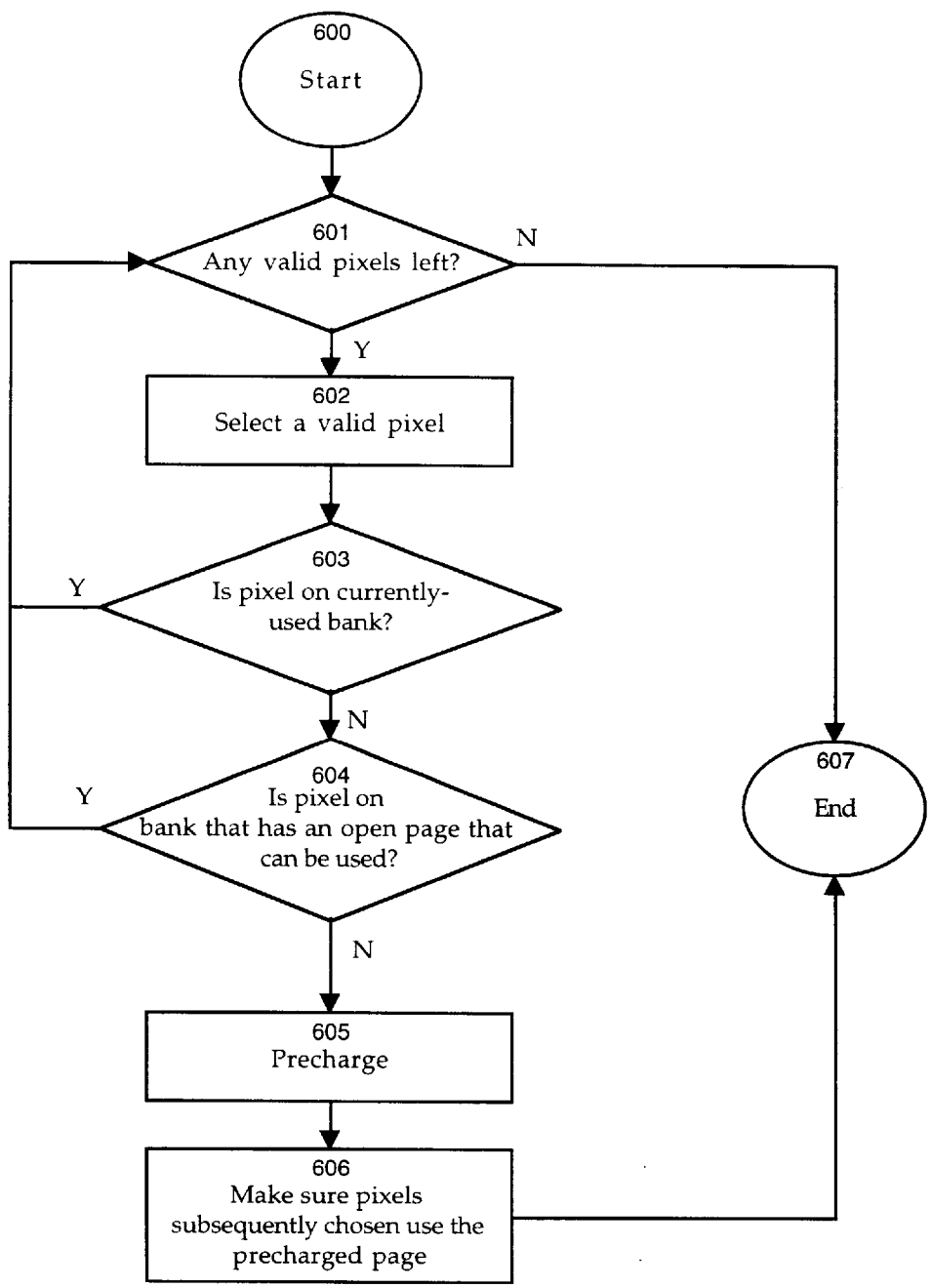
FIG. 6 is a flowchart of a method of selecting a page to be precharged according to one embodiment of the present invention.

When not in FIFO mode, PPH 202 in one embodiment precharges one page on some "alternate" bank when it is possible to do so. Precharging is a technique that is well-known in the art. By precharging a page on an alternate bank, the present invention is able to hide the precharge penalty by interleaving precharge with another read or write. Referring now to FIG. 6, there is shown a flowchart of a method of selecting a page to be precharged. First, PPH 202 determines 601 whether there are any valid pixels left. A bank will be precharged only if there is a valid pixel that can use a page on that bank. In one embodiment, PPH 202 performs this determination by checking the valid bit of the pixels. If no valid pixels are left, no pages will be precharged. Otherwise, PPH 202 selects 602 a valid pixel.

PPH 202 then determines 603 whether the selected pixel is on the currently-used bank. If so, the bank is not precharged, and PPH 202 returns to 601 to select another pixel. In one embodiment, PPH 202 performs the determination in 603 by checking whether the pixel status is 0×7 or 0×5, which indicates that the pixel is on the currently-used bank.

If the selected pixel is not on the currently-used bank, PPH 202 then determines 604 whether the pixel is on a bank for which there is an open page that can be used. If so, using that open page incurs no penalty; therefore, the bank is not precharged and PPH 202 returns to 601 to select another pixel. In one embodiment, PPH 202 performs the determination in 604 by checking whether the bank containing the pixel has another pixel with matching bank; in other words, PPH 202 the pixel's bank against the banks of all other pixels with status 0×3. Alternatively, for simplicity, PPH 202 can simply check whether there is any pixel that can still use another bank; i.e. determine whether there any pixel on the bank with status 0×3.

If the selected pixel is not on a bank that has an open page that can be used, PPH 202 proceeds to precharge 605 the page containing the pixel, as described more fully below. PPH 202 then ensures 606 that pixels subsequently chosen to use the precharged bank use the page that was precharged. In one embodiment, PPH 202 implements this by updating the table of open pages after the precharge 605 is performed. Thus, after PPH 202 selects pixels for the current bank and open page, it will automatically select pixels for the open page just precharged, since the pixel selection method prefers open pages to page breaks. In practice, PPH 202 uses essentially the same page update protocol used for page breaks, and therefore typically requires an additional two cycles before the page tables are actually updated. In the interim, it explicitly passes through only those pixels whose addresses are for the current bank and open page.

The method of alternate bank precharge according to one embodiment will now be described. Alternate bank precharge is implemented by MPE 303, control module 304, and pixels module 306. When MPE 303 detects that an alternate bank can be precharged (by the method of FIG. 6), it writes the o_index to control module 304 and pixels module 306, and asserts o_precharge. MPE 303 also sets a single status bit, in_precharge, which guides subsequent actions. Whenever in_precharge is set, MPE 303 issues transactions only on the current bank and open page. This is in contrast to its behavior when a page break occurs; in the latter case MPE 303 issues no further transactions until the page update protocol has completed.

When control module 304 receives a precharge request, it saves the bank to be precharged in a register precharge_bank, and at the next cycle initiates essentially the same page update protocol (via o_precharge) that is used on a page break, as described above. There are three differences: 1) names of the signals include precharge instead of pbreak; 2) heap module 305 does not delete the pixel that causes the precharge; and 3) MPE 303 allows pixels with addresses for the current page and bank to pass through during precharge.

The operation of heap module 305 on receiving i_precharge are essentially the same as its actions on receiving i_pbreak; in particular, it saves the RAS to be precharged in save_RAS. On the cycle after this, control module 304 is returned the RAS via i_RAS, and it updates open_pages[precharge_bank] to i_RAS. During the two cycles that heap module 305 and control module 304 exchange information, heap module 305 continues to generate candidate pixels for memory accesses. If any of these are for the current bank and open page, they are passed on to control module 304 and pixels module 306 by MPE 303, and are issued as memory transactions to the FIFO queue. No other transactions are allowed by MPE 303 until the in_precharge bit is cleared. This occurs on the final cycle of the page update protocol, when heap module 305 asserts i_valid_RAS to control module 304 and MPE 303.

A precharge request to pixels module 306 is identical to a read or write except that i_precharge is asserted; since pixels module 306 concatenates the precharge bit with the bank, RAS, and CAS address when it writes an entry to memory controller FIFO queue 203, pixels module 306 is effectively unaware that the transaction is a precharge rather than a read or a write. A page break and a precharge cannot occur simultaneously; MPE 303 keeps minimal state to prevent this.

From the above description, it will be apparent that the invention disclosed herein provides a novel and advantageous system and method of reordering pixels in graphics systems to improve bandwidth and performance. The foregoing discussion discloses and describes merely exemplary methods and embodiments of the present invention. As will be understood by those familiar with the art, the invention may be embodied in other specific forms without departing from the spirit or essential characteristics thereof. In particular, the pixel priority heap described above may have application in any architecture involving paged memory systems, including both graphics systems and other applications. Accordingly, the disclosure of the present invention is intended to be illustrative, but not limiting, of the scope of the invention, which is set forth in the following claims.

What is claimed is:

1. A system for reordering memory references for pixels to improve memory locality in a page-mode memory architecture, comprising:
    an available module for receiving pixel memory references from a client graphics engine; and
    a pixel priority heap coupled to the available module for receiving pixel memory references from the available module, for reordering pixel memory references to improve memory locality, and for transmitting reordered pixel memory references to a memory controller;
    wherein:
        the pixel priority heap comprises a plurality of slots for storage of pixel memory references, each slot having a status selectable from an available status indicating that no reference is stored in the slot and an unavailable status indicating that a reference is stored in the slot; and
        the available module further stores indices representing available slots in the pixel priority heap.

2. The system of claim 1, wherein the pixel memory references comprise addresses into a texture memory space.

3. The system of claim 1, wherein the pixel memory references comprise addresses into a frame buffer.

4. The system of claim 1, wherein the pixel priority heap reorders pixel memory references responsive to searching for memory references on open pages and banks.

5. The system of claim 1, wherein, responsive to a mode selection signal, the pixel priority heap selectively transmits memory references in the order received.

6. The system of claim 1, further comprising a memory controller coupled to the pixel priority heap for receiving transmitted reordered pixel memory references and for accessing memory in response to the reordered pixel memory references of the pixel priority heap.

7. The system of claim 1, wherein the pixel priority heap further comprises:
    a heap module containing the plurality of slots of the pixel priority heap the heap module for storing pixel memory references and tags describing storage locations of the pixel memory references;
    a control module coupled to the heap module for tracking open memory pages; and
    a modified priority encoder coupled to the heap module and to the control module, for selecting a pixel memory reference to be transmitted to the memory controller.

8. The system of claim 7, further comprising a pixels module coupled to the modified priority encoder and to the memory controller for pipelining pixel memory references to the memory controller.

9. The system of claim 1, wherein the pixel priority heap selectively precharges a memory page on an alternate bank.

10. A system for reordering memory references for pixels to improve memory locality in a page-mode memory architecture, comprising:
    a heap module comprising a plurality of slots, each slot for storing a pixel memory reference and tags describing a storage location of the pixel memory reference, each slot further having a status selectable from an available status indicating that no reference is stored in the slot and an unavailable status indicating that a reference is stored in the slot;

an available module coupled to the heap module for receiving pixel memory references from a client graphics engine, for storing indices representing available slots in the pixel priority heap and for transmitting pixel memory references to the heap module;

a control module coupled to the heap module for tracking open memory pages;

a modified priority encoder coupled to the heap module and to the control module, for selecting a pixel memory reference to be transmitted responsive to searching for memory references on open pages and banks to improve memory locality;

a pixels module coupled to the modified priority encoder for pipelining pixel memory references; and a memory controller coupled to the pixels module for receiving pipelined reordered pixel memory references from the pixels module and for accessing memory in response to the pixel memory references.

11. A method of reordering memory references for pixels to improve memory locality in a page-mode memory architecture, comprising:

a) writing a pixel memory reference into an available slot of a pixel priority heap, the pixel priority heap comprising a plurality of slots for storage of pixel memory references, each slot having a status selectable from an available status indicating that no reference is stored in the slot and an unavailable status indicating that a reference is stored in the slot; and b) concurrently with a):
   b.1) selecting an unavailable slot of the pixel priority heap containing a pixel memory reference; and
   b.2) transmitting the pixel memory reference contained in the selected unavailable slot to a memory controller.

12. The method of claim 11, wherein b) comprises:

b.1.1) determining whether any unavailable slots of the pixel priority heap contain pixel memory references matching an open page and bank of an immediately previously transmitted pixel memory reference;

b.1.2) responsive to b.1.1) indicating that a matching pixel memory reference exists, transmitting the pixel memory reference; and b.1.3) responsive to b.1.1) indicating that a matching pixel memory reference does not exist:
   b.1.4) determining whether any unavailable slots of the pixel priority heap contain pixel memory references matching any open page;
   b.1.5) responsive to b.1.4) indicating that a matching pixel memory reference exists, transmitting the pixel memory reference; and
   b.1.6) responsive to b.1.4) indicating that a matching pixel memory reference does not exist and responsive to the existence of any valid pixel memory reference:
      b.1.7) issuing a page break; and
      b.1.8) selecting and transmitting a valid pixel memory reference.

13. The method of claim 11, further comprising:

c) selectively precharging a memory page on an alternate bank.

14. The method of claim 13, wherein c) comprises:

c.1) determining if any valid pixel memory references exist; and c.2) responsive to c.1) indicating that at least one valid pixel memory reference exists:
   c.3) selecting a valid pixel memory reference having an associated memory page;
   c.4) responsive to the selected reference being associated with a currently-used bank of memory, returning to c.1);
   c.5) responsive to the selected reference being associated with a bank having a usable open page, returning to c.1); and
   c.6) responsive to the selected reference not being associated with a currently-used bank of memory and not being associated with a bank having a usable open page, precharging the memory page associated with the selected reference.

* * * * *

UNITED STATES PATENT AND TRADEMARK OFFICE
CERTIFICATE OF CORRECTION

PATENT NO.    : 5,852,451

DATED         : December 22, 1998

INVENTOR(S)   : Michael B. Cox, Dinyar B. Lahewala, Dong-Ying Kuo

It is certified that error appears in the above-identified patent and that said Letters Patent is hereby corrected as shown below:

```
On the title page: Item [73]
```
Assignee: S3 Incorporation, Santa Clara, Calif. with --Assignee: S3 Incorporated, Santa Clara, Calif.--

Signed and Sealed this

Thirtieth Day of March, 1999

Attest:

Q. TODD DICKINSON

*Attesting Officer*          *Acting Commissioner of Patents and Trademarks*